United States Patent [19]

Horwitz et al.

[11] 4,208,377
[45] Jun. 17, 1980

[54] PROCESS FOR RECOVERING ACTINIDE VALUES

[75] Inventors: E. Philip Horwitz, Elmhurst; George W. Mason, Clarendon Hills, both of Ill.

[73] Assignee: The United States of America as represented by the United States Department of Energy, Washington, D.C.

[21] Appl. No.: 928,026

[22] Filed: Jul. 25, 1978

[51] Int. Cl.$^2$ .............................................. C02B 1/32
[52] U.S. Cl. ......................................... 423/8; 423/10; 423/18; 423/19; 252/301.1 W
[58] Field of Search .................... 423/8, 10, 18, 20; 252/301.1 W

[56] References Cited

U.S. PATENT DOCUMENTS 4,162,230  7/1979  Horwitz et al. ...................... 423/10

Primary Examiner—Brooks H. Hunt
Attorney, Agent, or Firm—R. V. Lupo; Frank H. Jackson; James W. Weinberger

[57] ABSTRACT

A process for rendering actinide values recoverable from sodium carbonate scrub waste solutions containing these and other values along with organic compounds resulting from the radiolytic and hydrolytic degradation of neutral organophosphorous extractants such as tri-n butyl phosphate (TBP) and dihexyl-N,N-diethyl carbamylmethylene phosphonate (DHDECAMP) which have been used in the reprocessing of irradiated nuclear reactor fuels. The scrub waste solution is preferably made acidic with mineral acid, to form a feed solution which is then contacted with a water-immiscible, highly polar organic extractant which selectively extracts the degradation products from the feed solution. The feed solution can then be processed to recover the actinides for storage or recycled back into the high-level waste process stream. The extractant is recycled after stripping the degradation products with a neutral sodium carbonate solution.

8 Claims, 1 Drawing Figure

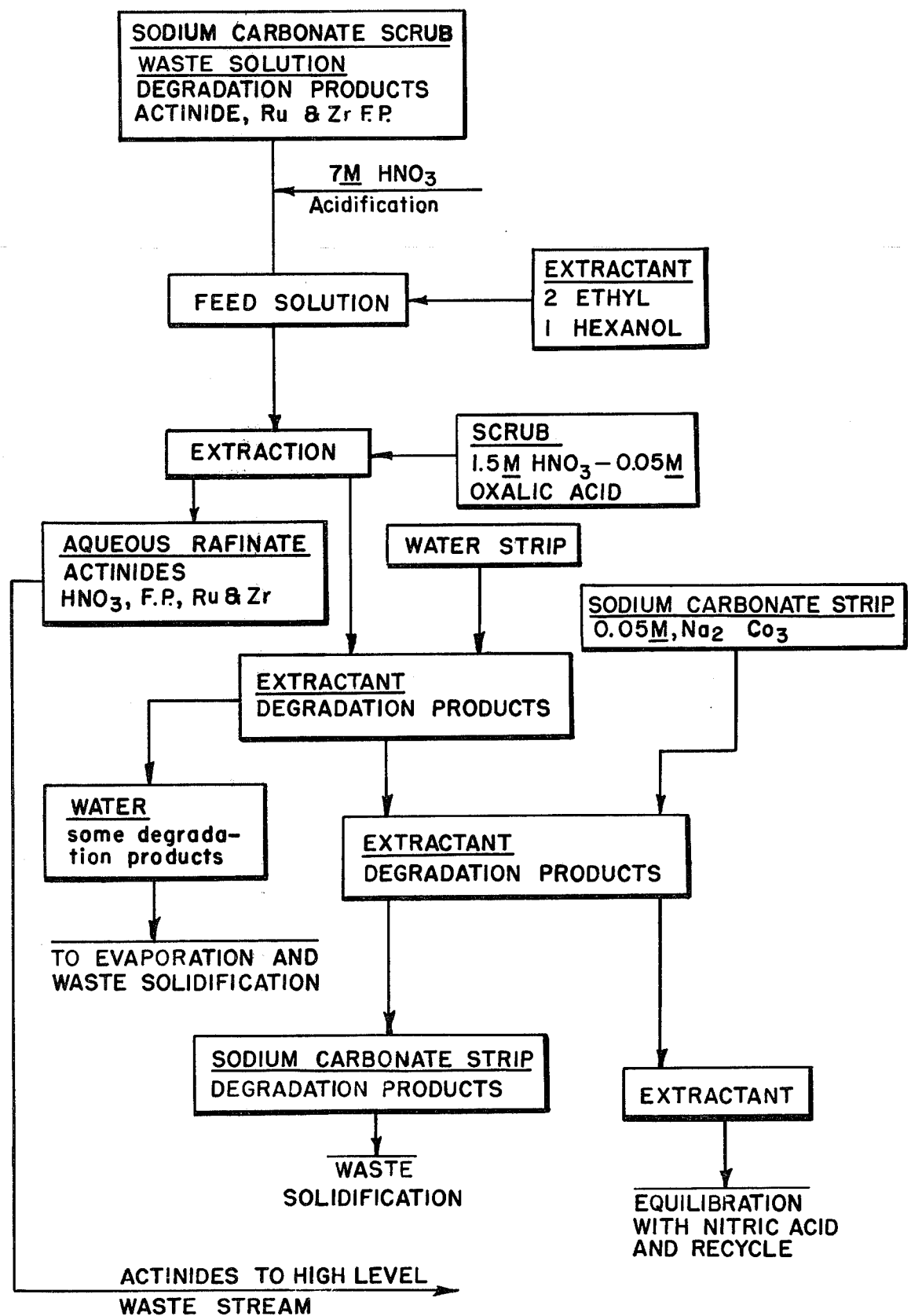

4,208,377

PROCESS FOR RECOVERING ACTINIDE VALUES

CONTRACTUAL ORIGIN OF THE INVENTION

The invention described herein was made in the course of, or under, a contract with the UNITED STATES DEPARTMENT OF ENERGY.

BACKGROUND OF THE INVENTION

This invention relates to a process for recovering actinide values. More specifically this invention relates to a process for treating waste carbonate solutions which have been used to scrub actinides and other values and organic radiolytic and hydrolytic degradation products from neutral organo-phosphorous compounds which have been used as extractants in nuclear fuel reprocessing cycles in order to recover the actinide values.

In the Purex process for reprocessing of irradiated nuclear fuels, a neutral organo-phosphorous extractant such as tri-n butyl phosphate (TBP) or dihexyl-N,N-diethyl carbamylmethylene phosphonate (DHDECMP) phosphate is diluted with a normal paraffin hydrocarbon such as n-dodecane and is used to recover the actinides from an aqueous nitric acid feed solution. During reprocessing the extractants are subjected to high radioactivity and other adverse conditions which cause the extractant to undergo significant radiolytic and hydrolytic degradation, forming acidic extractants such as dibutyl phosphoric acid (HDBP) and monobutylphosphoric acid ($H_2MBP$), which interfere with the extraction process and with the recovery of the actinides from the extractant. These degradation products are themselves good extractants, especially for the hexa- and tetravalent actinides and certain fission products such as ruthenium and zirconium. The extractants have especially high distribution ratios at the low acid concentrations used to back-extract U(VI) and Pu(IV) from TBP and U(VI), Np(IV), Pu(IV) and Am(III) from DHDECMP. Thus, extractable complexes of actinides and zirconium are formed during stripping operations. At high concentrations of degradation products, the extractable complexes may precipitate, sometimes in sufficient quantities to interfere with liquid-liquid extraction operations.

The TBP and DHDECMP extractant solutions must be cleaned up periodically so that they can be recycled back into the extraction process. This is presently done by contacting them with a sodium carbonate scrub solution which forms water-soluble sodium salts with the acidic extractants. In addition, the scrub solution also forms carbonate-complexes of the actinides and zirconium, which are fairly soluble in excess carbonate. Thus, the sodium carbonate scrub waste solution, resulting from contact with TBP-dodecane extractant, will consist essentially of $NaHCO_3$—$NaNO_3$ and contain varying amounts of sodium dibutyl phosphate (NaDBP), disodium monobutyl phosphate ($Na_2MBP$), carbonato-actinide and carbonato-zirconium complexes, depending upon the extent of hydrolysis and radiolysis. Analogous wastes from DHDECMP-diisopropyl benzene (DIPB) processing are similar in composition but contain mono- and di-acidic salts formed by hydrolysis of the ester groups in DHDECMP.

At present, the scrub waste solutions containing the actinides and degradation products which result from the cleanup of the organic extractants are stored in stainless steel containers. However, since as much as 6 kg of actinide may be present in the sodium carbonate scrub waste solutions resulting from the clean up of extractants used to process one metric ton of light water reactor fuel, it is imperative that some method be found to recover and concentrate these actinides for appropriate and suitable long-term storage.

The efficient removal of actinides and fission products from the sodium carbonate scrub waste solutions presents several problems. For example, neutralization of the carbonate solutions with $HNO_3$ followed by cation exchange results in poor metal ion absorption on the resin, precipitate formation of some of the metal ions as complexes of the degradation products, and in extensive column plugging. Acidification of the carbonate solutions with excess $HNO_3$ followed by extraction with TBP or preferably DHDECMP, results in the rapid buildup of high concentrations of acid degradation products which prevent efficient back-extraction. Thus, there are no satisfactory methods for the efficient and effective recovery of the actinide values from the scrub waste solutions so that the actinides may be utilized or prepared for long-term storage.

SUMMARY OF THE INVENTION

A process has been developed for rendering actinide values recoverable from sodium carbonate scrub waste solutions which eliminates many of the above enumerated problems. We have found that by extracting the radiolytic and hydrolytic degradation products away from the scrub solutions, it becomes relatively easy to recover the actinide values from the waste solution for further processing or storage. Thus in the process of the invention, for rendering the actinide values recoverable, the sodium carbonate scrub waste solution containing the actinide and other values and radiolytic and hydrolytic degradation products from neutral-organo-phosphorus extractants, is made acidic with mineral acid to form a feed solution, the feed solution is then contacted with a water-immiscible highly polar organic extractant which selectively extracts the radiolytic and hydrolytic degradation products away from the feed solution while the actinide values remain in the feed solution, and separating feed solution from the organic extractant. The actinide values are readily recoverable by evaporating the water from the feed solution for processing or storage or the solution may be recycled back into the high-level waste process stream.

The process of the invention is advantageous in that the water-immiscible highly-polar extractant may be any of a number of readily available relatively inexpensive alcohols, carboxylic acids or ketones which may be easily recovered, purified and recycled. For example, the degradation products are readily stripped by contacting the polar extractant with a sodium carbonate solution. The extractant may then be recycled while the carbonate strip solution containing the degradation products is concentrated and stored, for example, by incorporation into concrete. The recovered actinide and fission product values are preferably recycled back into the normal high-level liquid waste process stream for handling and ultimate recovery or disposal with the actinide values already present in the stream, thus eliminating the necessity for a separate process stream.

It is therefore the object of this invention to provide a process for rendering actinide values recoverable from sodium carbonate waste scrub solutions containing these and other values along with radiolytic and hydrolytic degradation products from neutral organophosphorus extractants used in reprocessing irradiated nuclear fuel.

BRIEF DESCRIPTION OF THE DRAWING

The FIGURE is a flow diagram of the process of the invention for rendering actinide values recoverable from aqueous sodium carbonate scrub waste solutions.

DESCRIPTION OF THE PREFERRED EMBODIMENT

This and other objects of the invention for rendering actinide values recoverable from aqueous sodium carbonate scrub waste solutions containing these and other values and radiolytic and hydrolytic degradation products of neutral organophosphorus extractants used in the reprocessing of irradiated nuclear reactor fuel may be met by adding sufficient nitric acid to the scrub waste solution to make the solution from about 2 to 4 molar in acid, forming a feed solution; contacting the feed solution with an organic extractant of 2-ethyl-1-hexanol (2-EHOH) which selectively extracts the degradation products from the feed solution leaving the actinide and other values in the feed; and separating the extractant containing the degradation products from the feed solution, whereby the actinide values are now recoverable from the aqueous sodium carbonate waste solution.

The sodium carbonate scrub waste solution containing the actinide values and degradation products must be made acidic to form the feed solution in order for the polar extractants to hydrogen bond to the degradation products. The acidification sometimes results in the formation of a precipitate, thought to be uranium complexes of mono- and dibutyl phosphate, which, however, is soluble and redissolves in the extractant. Contacting the scrub waste solution with the extractant before acidification will prevent formation of any precipitate without any adverse effect upon the process. While any mineral acid such as sulfuric or hydrochloric acid is suitable, nitric acid is preferred because it is compatible with most fuel reprocessing processes such as the Purex Process and also compatible with stainless steel processing equipment. The scrub solution should be anywhere from about 0.1 molar to about 15 molar in acid while the preferred range is 2 to 4 molar.

The liquid extractant may be any water-immiscible highly polar organic compound which will form hydrogen bonds with the neutral organo-phosphorus degradation products of sufficient strength to extract them from the aqueous solution. Thus the extractant may include alcohols, dihydric alcohols, carboxylic acids, dicarboxylic acids, ethers and ketones and isomers thereof. The extractants may preferably contain from about 4 to 11 carbon atoms, so that the liquids are water-immiscible and yet not so viscous as to present difficulties with phase separation. Two extractants found to be particularly suitable because of cost and availability are 2-ethyl-1-hexanol (2-EHOH) and 2-ethyl-1-hexanoic acid (2-EHA). The extractants are preferably used undiluted to keep fluid volumes to a minimum. The quantity of extractant is not critical, only that the feed solution be contacted with an amount sufficient to attach, by polar bonding, to the degradation products present in the feed so that they are removed from the aqueous solution. Contact of the loaded extractant with a nitric acid scrub which is about 2.0 to 5.0 M in $HNO_3$ and 0.01 to 0.1 M in oxalic acid ($H_2O_x$), preferably 1.5 M, in nitric acid and 0.05 M $H_2O_x$ may be necessary to remove any actinide values which may become entrapped in the extractant and any fission product zirconium which is co-extracted.

After separation of the extractant and the feed solution, the actinide values are readily recoverable from the aqueous raffinate. For example, the raffinate may be heated to evaporate the water, leaving the actinide values behind. Preferably, since these actinide values represent a high level of radioactivity, the aqueous raffinate is returned to the appropriate processing stream such as the high-level liquid waste (HLLW) stream in the Purex process for processing with the other actinide values in that process stream.

The extractant containing the degradation products can be recycled by first contacting it with a water strip solution to remove any nitric acid remaining in the extractant and to strip most of the monobutyl phosphoric acid degradation product from the extractant. This is followed by contact with a carbonate strip solution which is about 0.1 to 1.0 M, preferably 0.25 M, in sodium carbonate to remove the remaining dibutyl phosphate degradation products from the extractant. The two aqueous strip solutions may be combined or treated separately by evaporation to recover the degradation products which may then be stored as solid waste, for example by mixing with concrete. The stripped extractant, after equilibration with nitric acid, may then be recycled.

The extraction temperature is not critical and may be carried out over a range from about 25° to 75° C., with 50° C. generally preferred due to the self-heating effect of the radioactive solutions. In general, contact times are not critical, although 30 seconds has been found satisfactory to ensure phase mixing. The actual extraction operation can be carried out in batch or continuous operation, using, for example, simple mixer-settlers, direct or countercurrent flow, centrifugal contactors, liquid-liquid extraction in a chromatographic column or using similar conventional type equipment known to those skilled in the art. Phase ratios can be varied depending upon engineering considerations and economic factors.

The process of the invention has also been found useful for extracting anionic detergents, such as the sodium salt of dodecylbenzene sulfonic acid, away from the actinides. These detergents are used to decontaminate equipment and clothing from the actinides.

The following examples are given to illustrate the process of the invention and are not to be taken as limiting the scope of the invention as defined by the appended claims.

EXAMPLE I

A synthetic waste scrub solution was made up having the composition as set forth in the table below:
0.21 M $Na_2CO_3$
0.038 M $NaHCO_3$
0.38 M $NaNO_3$
0.015 M HDBP
0.005 M $H_2MBP$
0.0075 M U(VI)
Trace Pu(IV)
Trace Am(III)

To 2.5 ml of the above waste scrub was added 2.65 ml of 8 M $HNO_3$ to prepare 5.31 ml of a feed solution 4.0 M in $HNO_3$. The feed solution was then contacted with 3.2 ml of 2-ethyl-1-hexanol extractant which had been equilibrated with $HNO_3$ for several minutes, allowed to settle, and separated. The loaded extractant was contacted with 1.1 ml of 1.5 M nitric acid-0.05 M $H_2O_x$ to scrub any actinides which may have been coextracted. The nitric acid scrub was added to the carbonate solution forming about 6.5 ml of aqueous raffinate. The extractant was first contacted with 1.6 ml of water to wash the nitric acid from the extractant and then contacted with 6.4 ml of 0.05 M $Na_2CO_3$ which stripped the HDBP and $H_2MBP$ degradation products from the extractant. Analysis of the raffinate showed that using six extractant stages with six scrub stages would give a decontamination factor from all actinides of about $10^5$, decontamination from the degradation product $H_2MBP$ of $10^3$ and from HDBP of $>10^6$.

EXAMPLE II 2500 liters of a simulated aqueous waste scrub solution is prepared containing 0.25 M $Na_2CO_3$, radiolytic and hydrolytic degradation products of TBP and DHDECMP such as dibutyl phosphoric acid, monobutyl phosphoric acid and mono- and diacidic degradation products of DHDECMP, about 6 kg of the actinides, U, Pu and Am, and about 100 grams of fission products. The quantities of degradation products, actinides, fission products, etc. are based on a Purex Process using TBP, processing light water reactor fuel irradiated to 33,000 Mwd/metric ton of heavy metal. The waste scrub solution represents the combined TBP and DHDECMP sodium carbonate scrub solutions. Many process related variables will determine the actual composition and volume of the waste sodium carbonate scrub solution, such as the radiation and hydrolytic damage to the TBP and DHDECMP extractant solutions, which depends upon cooling time of the fuel and residence time of the extractants in the equipment, the actinide and fission product composition of the organic extractants during stripping operations and the relative flow rates of the extractant and sodium carbonate scrub stream.

To the 2500 liters of waste scrub solution are added 2654 liters of 8 M $HNO_3$ to form 5308 liters of feed solution now containing $NaNO_3$. The feed is then contacted with about 3185 liters of 2-ethyl-hexanol in six stages which extracts the degradation products from the feed solution. The extractant is then scrubbed with 1062 liters of 1.5 M $HNO_3$-0.05 M $H_2O_x$ solution in six stages to recover any actinides or fission products which may have coextracted, and the scrub solution being added to the feed raffinate to form a combined raffinate of 6370 liters which contains 4.0 M $HNO_3$, 0.20 M $Na_2NO_3$, 6 kg actinides and 100 g fission products. The raffinate is then heated to drive off the water and concentrate the remaining constituents which are then put back into the high-level liquid waste process stream.

The extractant containing the degradation products and some fission products is first contacted with 1611 liters of water strip in three stages to remove the nitric acid remaining in the extractant and to strip the monobutyl phosphate degradation product for evaporation and waste solidification.

The stripped extractant is next contacted with about 806 liters of a 0.25 M $Na_2CO_3$ solution in four stages which strips the remaining degradation products from the extractant. The carbonate strip can then be treated for permanent waste disposal. The extract is then contacted with about 641 liters of 7.5 M $HNO_3$ for final clean-up and equilibration before being recycled.

As can be seen from the preceding discussion and examples, the process of this invention provides a simple and effective method for dealing with the problem of treating sodium carbonate scrub waste solutions so that the actinides can be recovered either for utilization or so that they may be provided with safe long-term storage.

The embodiments of the invention in which an exclusive property or privilege is claimed are defined as follows:

1. A process for rendering actinide values recoverable from sodium carbonate scrub waste solutions containing these and other values along with radiolytic and hydrolytic degradation products from neutral organophosphorous extractants used for the reprocessing of irradiated nuclear reactor fuels comprising:
    making the scrub waste solution acidic with a mineral acid to form a feed solution;
    contacting the feed solution with a water-immiscible highly polar organic extractant which selectively extracts the degradation products away from the feed solution; and
    separating the feed solution from the loaded extractant, whereby the actinide values are readily recoverable.

2. The process of claim 1 wherein the extractant is selected from the group consisting of alcohols, dihydric alcohols, carboxylic acids, dicarboxylic acids, ethers and ketones containing from about 4 to 11 carbon atoms.

3. The process of claim 2 wherein the feed solution is from about 0.1 to about 15 molar in acid.

4. The process of claim 3 including the additional step of contacting the loaded extractant with a nitric acid scrub solution containing oxalic acid to remove any actinide values which may be contained therein.

5. The process of claim 4 wherein the nitric acid scrub is from 2.0 to 5.0 M in nitric acid and from 0.01 to 0.1 M in oxalic acid.

6. The process of claim 5 wherein the feed solution is about 2 to 4 molar in acid.

7. The process of claim 6 wherein the extractant is selected from the group consisting of 2-ethyl-1-hexanol and 2-ethyl-1-hexanoic acid.

8. The process of claim 7 wherein the actinides are recovered by evaporating the water from the feed solution, whereby the actinides remain behind.

* * * * *